(12) United States Patent
Sato et al.

(10) Patent No.: US 9,417,333 B2
(45) Date of Patent: Aug. 16, 2016

(54) RADIATION IMAGING APPARATUS AND RADIATION IMAGING SYSTEM

(71) Applicant: CANON KABUSHIKI KAISHA, Tokyo (JP)

(72) Inventors: Sho Sato, Saitama (JP); Toshio Kameshima, Kumagaya (JP); Tomoyuki Yagi, Honjo (JP); Katsuro Takenaka, Honjo (JP); Hideyuki Okada, Honjo (JP); Atsushi Iwashita, Honjo (JP); Eriko Sugawara, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 14/010,379

(22) Filed: Aug. 26, 2013

(65) Prior Publication Data

US 2014/0061488 A1    Mar. 6, 2014

(30) Foreign Application Priority Data

Aug. 31, 2012  (JP) ................................. 2012-192416

(51) Int. Cl.
  *G01T 1/24*  (2006.01)
  *G01T 1/17*  (2006.01)
  *H04N 5/32*  (2006.01)

(52) U.S. Cl.
  CPC .. *G01T 1/17* (2013.01); *H04N 5/32* (2013.01); *G01T 1/247* (2013.01)

(58) Field of Classification Search
  CPC ................................. H01N 5/32; G01T 1/247
  See application file for complete search history.

(56) References Cited

U.S. PATENT DOCUMENTS

| | | | | |
|---|---|---|---|---|
| 5,887,049 A | * | 3/1999 | Fossum | 378/98.8 |
| 6,307,915 B1 | * | 10/2001 | Frojdh | G01T 1/17 |
| | | | Enomoto | 348/E3.02 |
| 2005/0047546 A1 | * | 3/2005 | Fox et al. | 378/91 |
| 2010/0006767 A1 | | 1/2010 | | |

(Continued)

FOREIGN PATENT DOCUMENTS

| | | |
|---|---|---|
| CN | 1573534 A | 2/2005 |
| CN | 102313896 A | 1/2012 |

(Continued)

OTHER PUBLICATIONS

European Search Report issued in corresponding application No. 13182136.5 on Mar. 12, 2015.

(Continued)

*Primary Examiner* — Christine Sung
(74) *Attorney, Agent, or Firm* — Carter, DeLuca, Farrell & Schmidt, LLP

(57) ABSTRACT

A radiation imaging apparatus comprises: a detector that includes a detection unit in which pixels having a conversion element that converts radiation to an electric charge are arranged in a matrix shape, a drive circuit that drives the detection unit, and a read circuit that outputs an electric signal corresponding to the electric charge as image data; a radiation detection unit that detects a radiation irradiation state at a plurality of positions in the detection unit; and a control unit that controls operations of the drive circuit and the read circuit in accordance with a detection result obtained by the radiation detection unit, wherein the radiation detection unit detects a radiation irradiation state at least at a center region and a peripheral region in the detection unit, and a detection capability at the center region is set to a higher capability than a detection capability at the peripheral region.

14 Claims, 12 Drawing Sheets

(56) References Cited

U.S. PATENT DOCUMENTS

| | | |
|---|---|---|
| 2012/0001079 A1 | 1/2012 | Okada |
| 2012/0199750 A1* | 8/2012 | Kondou .................. H04N 5/32 250/370.09 |
| 2012/0199751 A1 | 8/2012 | Watanabe |
| 2013/0228694 A1 | 9/2013 | Nakatsugawa et al. |
| 2014/0021365 A1* | 1/2014 | Oda .............................. 250/395 |
| 2014/0061496 A1 | 3/2014 | Nakatsugawa et al. |

FOREIGN PATENT DOCUMENTS

| | | | |
|---|---|---|---|
| JP | H11-151233 A | 6/1999 | |
| JP | 2004-290615 A | 10/2004 | |
| JP | 2009219538 A | * | 10/2009 |
| JP | 2010-268171 A | | 11/2010 |
| JP | 2011-209245 A | | 10/2011 |
| WO | 2012/056899 A1 | | 5/2012 |
| WO | 2012/056949 A1 | | 5/2012 |

OTHER PUBLICATIONS

Chinese Office Action issued in corresponding application No. 201310376835.2 on Feb. 28, 2015.

European Office Action issued in EP Application No. 13182136.5 dated Jun. 29, 2016, 5 pages.

* cited by examiner

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system.

2. Description of the Related Art

In recent years, radiation imaging apparatuses including a flat panel detector (hereinafter abbreviated as "FPD") formed of a semiconductor material have started to be put to practical use as radiation imaging apparatuses that used for medical diagnostic imaging or a nondestructive inspection using an X-ray. In an FPD, a plurality of pixels having conversion elements constructed using semiconductor material such as a-Si that is capable of converting radiation into electric charges and switching elements that transfer electric signals that correspond to the electric charges are arranged two-dimensionally. Such radiation imaging apparatuses including an FPD are used, for example, in medical diagnostic imaging as digital imaging apparatuses for still image radiographing like general radiographing or moving image radiographing such as fluoroscopic radiographing.

When performing radiographing, a radiation imaging apparatus performs radiographing in synchrony with the operations of a radiation generating apparatus. As synchronization methods, for example, a method is available in which the radiation generating apparatus and the radiation imaging apparatus are synchronized by electrically connecting the two apparatuses to each other, or a method is available in which the radiation imaging apparatus is synchronized with the radiation generating apparatus by detecting radiation that is radiated from the radiation generating apparatus. In the former case, because service personnel connect the radiation generating apparatus and the radiation imaging apparatus with a cable, the connection work involves time and labor, and furthermore the radiation generating apparatus and the radiation imaging apparatus must be fixed and used as a single pair of apparatuses. In the latter case, a method is known in which a radiation detector is provided inside and outside the radiation imaging apparatus, or in which the radiation imaging apparatus itself performs detection of radiation. In this case, there is the advantage that time and labor for connection work are not required, and the radiation imaging apparatus is portable and can be used in combination with various radiation generating apparatuses.

Normally, in an FPD, pixels that include a photoelectric conversion element and a switching element are two-dimensionally arrayed, and reading of signals from the photoelectric conversion elements and resetting of the photoelectric conversion elements is performed in row units. Before radiation is irradiated, the switching elements are subjected to on/off control in row units, and a dark current component flowing to the photoelectric conversion elements is reset. Hereunder, this operation is referred to as an "initializing operation". If a radiation irradiation signal is received or radiation is detected during an initializing operation, it is necessary to immediately end the operation to reset the photoelectric conversion elements and transition to an accumulation operation. If a transition is not made to the accumulation operation even though a radiation irradiation signal has been received, a time lag will arise between the time that the user pushed the exposure button and the actual photographed image, and an unintended image in which a difference in level or the like arises will be obtained. Further, if an initializing operation is continued even though radiation was detected, since radiation signals that are generated at the photoelectric conversion elements will be reset, unnecessary radiation will have been irradiated at the subject and the amount of radiation exposure may increase.

Japanese Patent Application Laid-open No. H11-151233 discloses technology that includes a radiation detection unit and that immediately shifts the operating state of a radiation imaging unit from a radiographing preparation state to an accumulation state when the start of radiation irradiation is determined. Further, Japanese Patent Application Laid-open No. 2010-268171 discloses technology that detects a current that flows through a bias wire that supplies a bias voltage to a radiation detecting element to control the operations of a radiation imaging apparatus.

However, with the technology disclosed in Japanese Patent Application Laid-open No. H11-151233, in some cases it is not possible for the radiation detection unit to adapt to various radiographing kinds (the radiographing site and the build of a subject, a moving image or a still image radiographing mode, and the like). In diagnostic imaging using radiation, radiation irradiation conditions differ depending on the kind of radiographing. Therefore, a radiation detection unit is demanded that is capable of accurately detecting irradiation of radiation with respect to various irradiation conditions.

SUMMARY OF THE INVENTION

An object of the present invention is to provide a radiation imaging apparatus that enables more favorable radiation detection.

The present invention provides a radiation imaging apparatus that comprises: a detector including a detection unit in which pixels having a conversion element that converts radiation into an electric charge are arranged in a matrix shape, a drive circuit configured to drive the detection unit to output electric signals that correspond to the electric charges from the pixels, and a read circuit configured to output the electric signals as image data; a radiation detection unit configured to detect an irradiation state of radiation at a plurality of positions in the detection unit; and a control unit configured to control operations of the drive circuit and the read circuit in accordance with a detection result obtained by the radiation detection unit, wherein the radiation detection unit detects the irradiation state of radiation at least at a center region in the detection unit and at a peripheral region in the detection unit that is separated from the center region, and a detection capability at the center region is set to a higher capability than a detection capability at the peripheral region.

According to the present invention, it is possible to provide a radiation imaging apparatus that can accurately detect irradiation of radiation with respect to various irradiation conditions to enable more favorable radiation detection.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiments of the present invention are described hereunder based on the accompanying drawings. Note that the term "radiation" as used with respect to the present invention refers not only to alpha rays, beta rays, and gamma rays which are generated by particles (including photons) emitted due to radioactive decay, but also includes beams having energy equal to or greater than the aforementioned rays, for example, X-rays, particle beams, and cosmic rays.

First Embodiment

Figure 1:
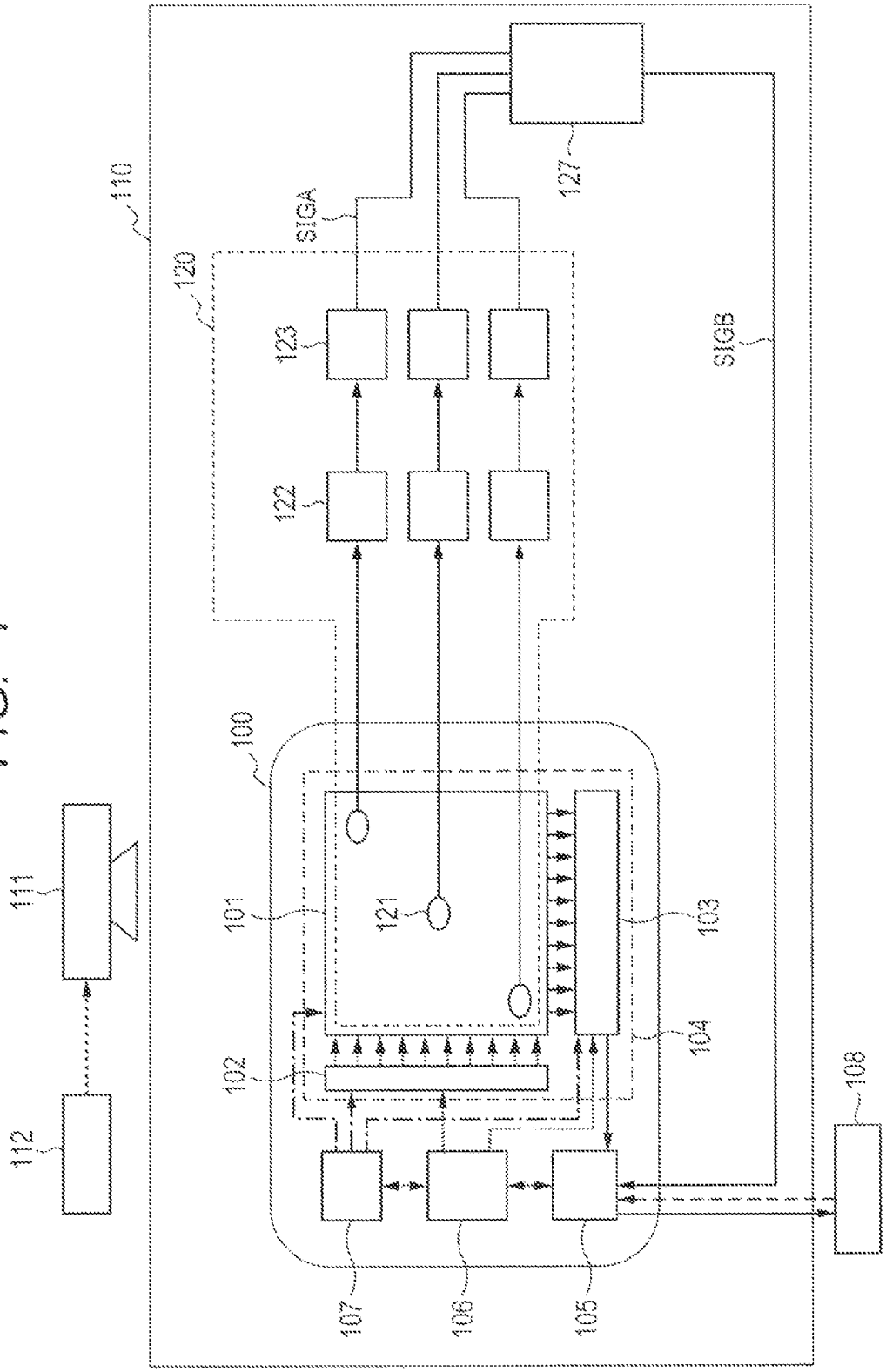
FIG. 1 is a view that illustrates a configuration example of a radiation imaging apparatus according to a first embodiment.

A first embodiment of the present invention will now be described. FIG. 1 is a block diagram that illustrates a configuration example of a radiation imaging apparatus according to the first embodiment. Note that, in addition to a radiation imaging apparatus 110 according to the first embodiment, FIG. 1 also illustrates a radiation generating apparatus 111 and a control console 112. In the present embodiment, the radiation imaging apparatus 110 and the radiation generating apparatus 111 are not electrically connected, and there is no exchange of signals therebetween. The radiation generating apparatus 111 irradiates radiation in accordance with radiation irradiation conditions received from the control console 112.

The radiation imaging apparatus 110 includes an imaging apparatus 100, a radiation detection unit 120, and a radiation determination unit 127. The imaging apparatus 100 includes a detector (FPD) 104 having a detection unit 101 including a plurality of pixels that convert radiation into electric signals, a drive circuit 102 that drives the detection unit 101, and a read circuit 103 that outputs electric signals from the detection unit 101 as image data. The imaging apparatus 100 further includes a signal processing unit 105 that processes the image data from the FPD 104 and that outputs the resulting data, a control unit 106 that controls operations of the FPD 104 by supplying respective control signals to each of the components, and a power supply unit 107 that supplies a bias to each of the components, respectively. The signal processing unit 105 receives a control signal transmitted from a control computer 108, and provides the control signal to the control unit 106. The signal processing unit 105 also receives information regarding the potential of a signal line that is transmitted from the read circuit 103 during a period in which radiation is irradiated, and transmits the information to the control computer 108. The power supply unit 107 includes a power supply circuit such as a regulator that receives a voltage transmitted from an unshown external power supply or internal battery, and that supplies required voltages to the detection unit 101, the drive circuit 102, and the read circuit 103.

The radiation detection unit 120 includes a radiation detection sensor 121, a current detection unit 122, and a comparison unit 123, and detects an irradiation state of radiation at a plurality of positions inside the detection unit 101. The radiation detection sensor 121 converts irradiated radiation into a current signal. The current detection unit 122 detects the current signal from the radiation detection sensor 121 and converts the current signal into a voltage signal. The comparison unit 123 compares the voltage signal from the current detection unit 122 and a threshold voltage, and outputs the comparison result as a radiation detection signal SIGA. In the present embodiment, two or more radiation detection sensors 121 are arranged inside the detection unit 101, and a current detection unit 122 is connected to each of the radiation detection sensors 121, respectively. The radiation determination unit 127 receives the radiation detection signal SIGA from each comparison unit 123 of the radiation detection unit 120, determines the existence/non-existence of radiation irradiation, and outputs the determination result as a radiation determination signal SIGB.

Note that although the radiation detection sensors 121 are arranged on a radiation irradiation face of the detection unit 101 according to the present embodiment, the radiation detection sensors 121 may be arranged on the opposite side of the radiation irradiation face. Further, to enable reliable detection of radiation irradiation even if a radiation irradiation region is narrowed, at least one radiation detection sensor 121 is arranged at a center part in the detection unit 101. According to the present embodiment, a direct-type sensor that converts radiation directly into an electric signal or a sensor formed by coating a fluorescent substance that converts radiation into visible rays on an Si photodiode may be used as the radiation detection sensor 121. However, the present invention is not limited to such sensors, and the radiation detection sensor may be a component that includes one part of wiring included in the detection unit 101 and obtains a signal that detects a radiation irradiation state from a predetermined region of the detection unit 101.

Figure 2:
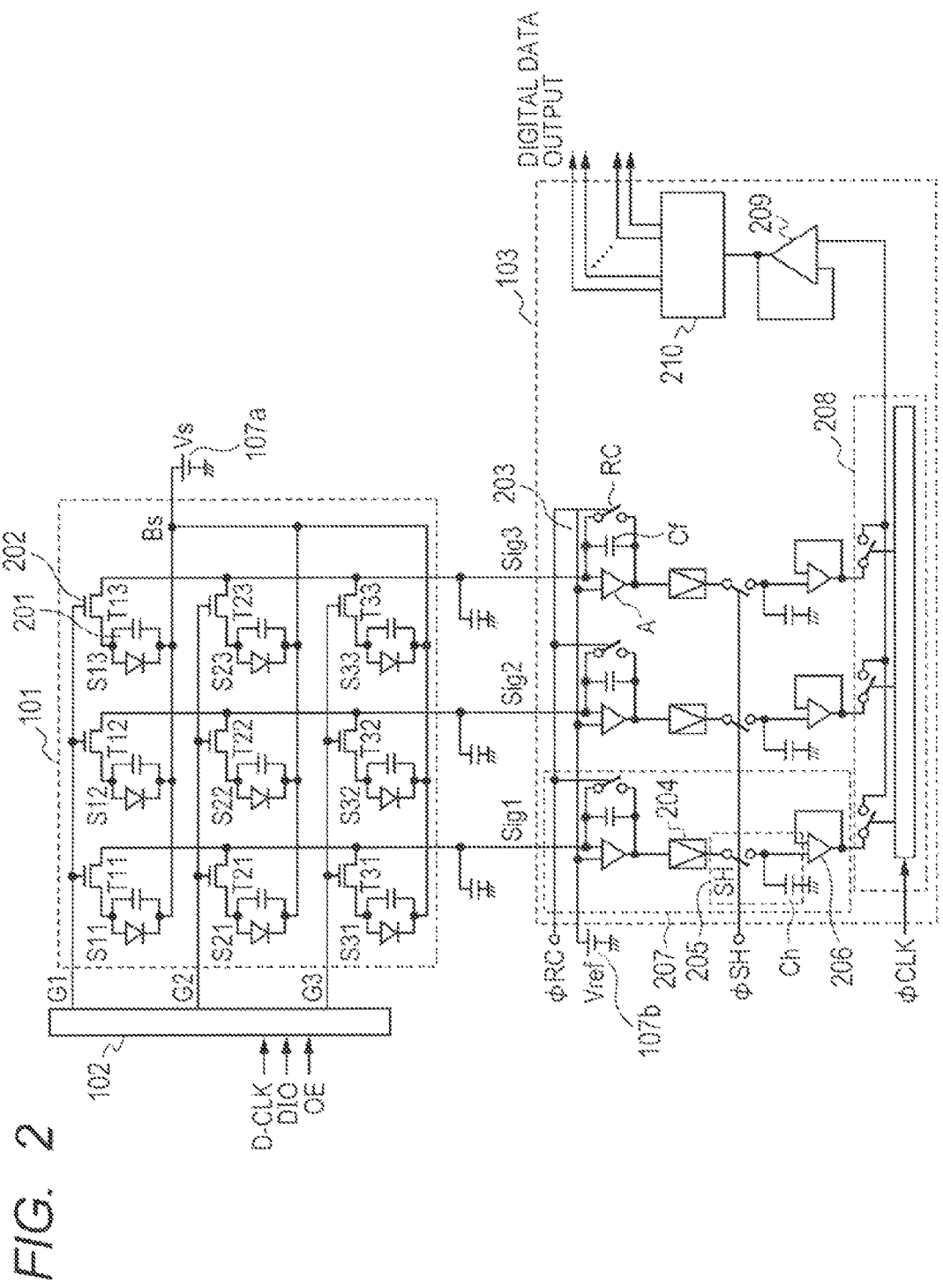
FIG. 2 is a view that illustrates a configuration example of an imaging apparatus according to the first embodiment.

Next, the imaging apparatus according to the first embodiment is described using FIG. 2. Elements in FIG. 2 having the same configuration as that described with reference to FIG. 1 are assigned the same reference numerals, and detailed descriptions thereof are omitted. Further, in FIG. 2, an imaging apparatus including an FPD having pixels of three rows by three columns is illustrated for ease of description. In actuality, however, an imaging apparatus has a larger number of pixels. For example, a 17-inch imaging apparatus has pixels of approximately 2800 rows by approximately 2800 columns.

The detection unit 101 has a plurality of pixels arranged in a matrix. In the present embodiment, each of the pixels has a conversion element 201 that converts radiation into an electric charge, and a switching element 202 that outputs an electric signal corresponding to the electric charge. In the present embodiment, a metal-insulator-semiconductor (MIS)-type photosensor that is provided on an insulating substrate such as a glass substrate and that includes amorphous silicon as the main material is used as a photoelectric conversion element which converts light into an electric charge. An indirect-type conversion element having a wavelength converter that is provided on the side on which radiation is incident of the above-described photoelectric conversion element and that converts radiation into light falling within the band of wavelengths that can be sensed by the photoelectric conversion element, or a direct-type conversion element that directly converts radiation into an electric charge is suitably used as the conversion element. A transistor having a control terminal and two main terminals is suitably used as the switching element 202. In the present embodiment, a thin film transistor (TFT) is used. One of the electrodes of the conversion element 201 is electrically connected to one of the two main terminals of the switching element 202, and the other electrode is electrically connected to a bias power supply 107a via a common bias line Bs.

A plurality of switch elements in the row direction, for example, switching elements T11, T12, and T13, have control terminals that are commonly electrically connected to a drive line G1 of the first row, and drive signals for controlling the conductive state of the switching elements are applied from the drive circuit 102 via drive lines on a row-by-row basis. In a plurality of switching elements in the column direction, for example, switching elements T11, T21, and T31, the other main terminals thereof are electrically connected to a signal line Sig1 of the first column, and electric signals corresponding to the electric charge of the conversion elements are output to the read circuit 103 via signal lines during a period in which the switching elements are in a conductive state. A plurality of signal lines Sig1 to Sig3 arranged in the column direction carry the electric signals output from the plurality of pixels to the read circuit 103 in parallel.

Although each of the pixels described in the present embodiment includes the conversion element 201 and the switching element 202, the present embodiment is not limited thereto. The present embodiment also includes a pixel that further includes at least an amplification transistor between the signal line Sig or conversion element 201 and the switching element 202, or a pixel that further includes an initialization transistor that initializes the conversion element 201 or a node provided between the conversion element 201 and the amplification transistor.

The read circuit 103 includes a plurality of amplifier circuits 207 that amplify the electric signals output in parallel from the detection unit 101, that are provided in correspondence with the respective signal lines. Further, each amplifier circuit 207 includes an integrating amplifier 203 that amplifies an output electric signal, a variable amplifier 204 that amplifies an electric signal from the integrating amplifier 203, a sample and hold circuit 205 that samples and holds the amplified electric signal, and a buffer amplifier 206.

The integrating amplifier 203 has an operational amplifier A that amplifies a read electric signal and that outputs the amplified signal, an integrating capacitor Cf, and a reset switch RC. The integrating amplifier 203 includes a mechanism that is capable of changing an amplification factor by changing the value of the integrating capacitor Cf. An output electric signal is input to an inverting input terminal of the operational amplifier A, a reference voltage Vref is input from a reference power supply 107b to a non-inverting input terminal of the operational amplifier A, and an amplified electric signal is output from an output terminal of the operational amplifier A. Further, the integrating capacitor Cf is arranged between the inverting input terminal and the output terminal of the operational amplifier A.

The sample and hold circuit 205 is provided in correspondence with each amplifier circuit 207, and is constituted by a sampling switch SH and a sampling capacitor Ch. Further, the read circuit 103 includes a multiplexer 208 that sequentially outputs electric signals read in parallel from the respective amplifier circuits 207 and that outputs the electric signals as serial image signals, and a buffer amplifier 209 that performs impedance conversion on the image signals and outputs the converted image signals. An image signal that is an analog electric signal output from the buffer amplifier 209 is converted into digital image data by an A/D converter 210 and is then output to the signal processing unit 105 illustrated in FIG. 1. Image data that is processed by the signal processing unit 105 is output to the control computer 108.

The drive circuit 102 outputs drive signals having a conductive voltage Vcom for bringing a switching element into a conductive state and a non-conductive voltage Vss for bringing a switching element into a non-conductive state in accordance with control signals (D-CLK, OE, DIO) input from the control unit 106 to the respective drive lines. Thus, the drive circuit 102 controls the conductive state and the non-conductive state of the switching elements, and drives the detection unit 101.

The power supply unit 107 illustrated in FIG. 1 includes the bias power supply 107a and the reference power supply 107b of the amplifier circuits 207 that are illustrated in FIG. 2. The bias power supply 107a commonly supplies a bias voltage Vs to the other electrode of each conversion element via the bias line Bs. The reference power supply 107b supplies the reference voltage Vref to the non-inverting input terminal of each operational amplifier.

The control unit 106 illustrated in FIG. 1 controls the operation of the FPD 104 by receiving a control signal from the control computer 108 or the like outside the apparatus via the signal processing unit 105 and supplying various control signals to the drive circuit 102, the power supply unit 107, and the read circuit 103. The control unit 106 illustrated in FIG. 1 controls the operation of the drive circuit 102 illustrated in FIG. 2 by supplying a control signal D-CLK, a control signal OE, and a control signal DIO to the drive circuit 102. Here, the control signal D-CLK is a shift clock of a shift register used as a drive circuit, the control signal DIO is a pulse that starts a transfer operation of the shift register, and OE is a signal that controls an output terminal of the shift register. Further, the control unit 106 controls the operations of the respective components of the read circuit 103 by supplying a control signal ΦRC, a control signal ΦSH, and a control signal ΦCLK to the read circuit 103 illustrated in FIG. 2. Here, the control signal ΦRC controls the operations of the reset switches of the integrating amplifiers, the control signal ΦSH controls the operations of the sample and hold circuit 205, and the control signal ΦCLK controls the operation of the multiplexer 208.

Figure 3:
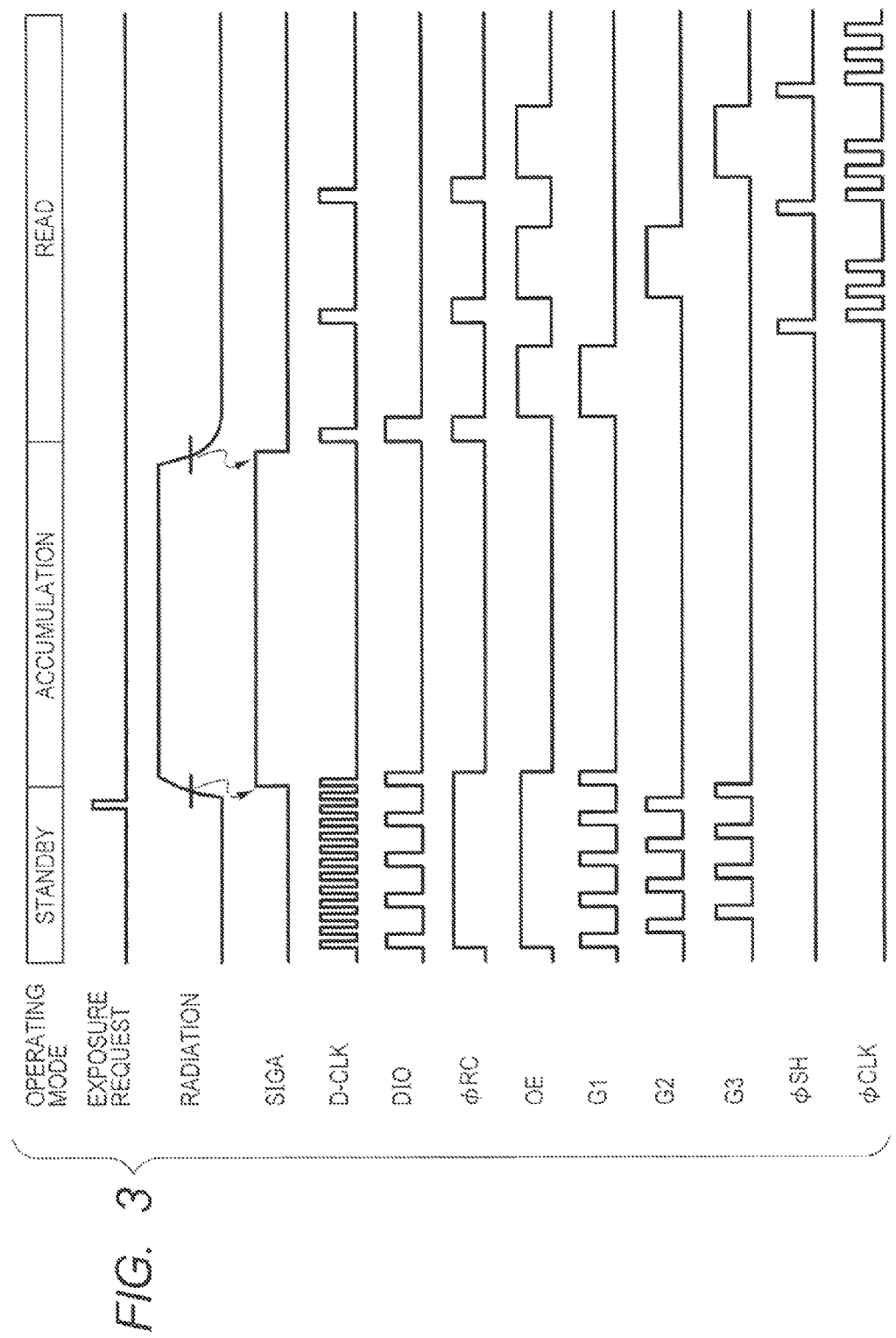
FIG. 3 is a timing chart illustrating an example of operations of the radiation imaging apparatus according to the first embodiment.

Next, the operations of the radiation imaging apparatus according to the first embodiment will be described with reference to FIGS. 1 to 3. First, when the power of the radiation imaging apparatus 110 is turned on, the bias voltage Vs is supplied to the conversion elements 201 of the imaging apparatus 100, and the imaging apparatus 100 enters a standby state. In the standby state, an initializing operation is repeatedly performed to reset a dark current that flows though the conversion elements S11 to S33. In the initializing operation, the control signal ΦRC is made a high level, and the integrating capacitor Cf of the integrating amplifiers 203 and the signal lines Sig are reset by the reset switch RC that is placed in a conductive state. Further, in synchrony with the control signal DIO and the control signal D-CLK that are sent to the drive circuit 102, the conductive voltage Vcom is applied to the drive line G1 to place the switching elements T11, T12, and T13 of the pixels in the first row in a conductive state. The conversion elements 201 are reset as a result of the switching elements entering a conductive state. The conversion elements 201 of all the pixels are reset by repeatedly performing control of the conductive state of the switching elements and resetting in this manner in sequence for the second row and third row. To continue the initializing operation, the control signal DIO is again sent to the drive circuit 102, and the conductive voltage Vcom is applied to the drive line G1 of the first row. The initializing operation is repeatedly performed in the above described manner while the imaging apparatus 100 is in the standby state.

When an exposure request signal is transmitted to the radiation generating apparatus 111 as a result of an operation by the operator at the control console 112, radiation irradiation is started immediately. When radiation is irradiated at the imaging apparatus 100, the radiation is also irradiated at the radiation detection sensors 121 of the radiation detection unit 120, and a detection result from the radiation detection unit 120 is input to the radiation determination unit 127 by means of the radiation detection signal SIGA. The radiation determination unit 127 determines the radiation irradiation state based on the radiation detection signal SIGA, and sends the radiation determination signal SIGB to the signal processing unit 105. Thus, when radiation irradiation is started, the start of irradiation of radiation is detected by the radiation detection unit 120, and a radiation determination signal SIGB that indicates the start of irradiation of radiation is sent to the signal processing unit 105 by the radiation determination unit 127. Next, the signal processing unit 105 that received the radiation determination signal SIGB indicating the start of irradiation of radiation sends a signal to the control unit 106 to stop the initializing operation and transition the operating state from the standby state to an accumulation state. As a result, the imaging apparatus 100 transitions from the standby state to the accumulation state. During the period in which the imaging apparatus 100 is in the accumulation state, the non-conductive voltage Vss is applied to the switching elements 202 so that the switching elements of all pixels enter a non-conductive state.

Thereafter, when the radiation irradiation ends, the end of irradiation of radiation is detected by the radiation detection unit 120, and a radiation determination signal SIGB that indicates the end of irradiation of radiation is sent to the signal processing unit 105 by the radiation determination unit 127. Next, the signal processing unit 105 that received the radiation determination signal SIGB indicating the end of irradiation of radiation sends a signal to the control unit 106 to transition the operating state from the accumulation state to a read state. As a result, the imaging apparatus 100 transitions from the accumulation state to a read state. In the read state, an actual read operation is performed in which the read circuit 103 causes electric signals that correspond to electric charges accumulated in the conversion elements 201 to be outputted from the pixels, and outputs the signals as pixel data.

In the actual read operation, first the integrating capacitors Cf and the signal lines Sig are reset by the reset switch RC that is placed in a conductive state by making the control signal ΦRC a high level in a pulse shape. Next, the conductive voltage Vcom is applied to the drive line G1 of the first row from the drive circuit 102 to place the switching elements T11, T12, and T13 of the pixels in the first row in a conductive state. As a result, electric signals based on electric charges generated in the conversion elements S11 to S13 of the pixels in the first row are output to the respective signal lines. The electric signals that are output in parallel via the respective signal lines are amplified by the operational amplifier 203 and variable amplifier 204 of each amplifier circuit 207, respectively. The respective electric signals amplified by the operational amplifiers 203 and variable amplifiers 204 are held in parallel in the sample and hold circuits 205 of the respective amplifier circuits 207 by the sample and hold circuit 205 operating in response to the control signal ΦSH. After the signals are held in the sample and hold circuits 205, the control signal ΦRC is made a high level in a pulse shape to reset the integrating capacitors Cf and signal lines Sig. After resetting, similarly to the operations performed for the first row, the conductive voltage Vcom is applied to the drive line G2 of the second row from the drive circuit 102, and the switching elements T21, T22, and T23 of the pixels of the second row are placed in a conductive state. In the period in which the switching elements T21, T22, and T23 of the pixels of the second row are in the conductive state, the multiplexer 208 sequentially outputs the electric signals that are held in the sample and hold circuit 205. As a result, the electric signals from the pixels in the first row that were read in parallel are converted into serial image signals and output, and the A/D converter 210 converts the serial image signals into image data for one row and outputs the image data. By performing the above described operations in row units from the first row to the third row, image data for one frame is output from the imaging apparatus.

Figure 4:
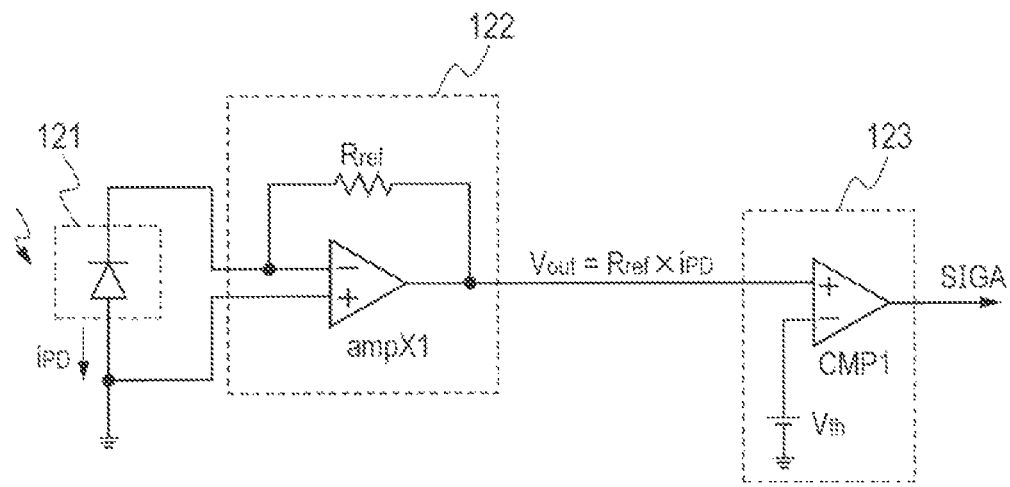
FIG. 4 is a view that illustrates a configuration example of a radiation detection unit according to the first embodiment.

Next, operations relating to radiation detection in the first embodiment are described using FIG. 4. FIG. 4 is a view that illustrates a configuration example of the radiation detection unit 120 according to the first embodiment. When radiation is irradiated at the radiation detection sensor 121, a current iPD that corresponds to an input amount of irradiated radiation flows to the radiation detection sensor 121. In addition, the current iPD also flows to a feedback resistance Rref that is connected between an inverting input terminal and an output terminal of an amplifier ampX1 of the current detection unit 122, and is subjected to current-voltage conversion by the amplifier ampX1 of the current detection unit 122. Note that the reference voltage Vref is input to the non-inverting input terminal of the amplifier ampX1. Here, a voltage value Vout that is output from the amplifier ampX1 is expressed as the product of the resistance value of the feedback resistance Rref and the current iPD. That is, the resistance value of the feedback resistance Rref corresponds to a gain of the amplifier ampX1, and a voltage value that is output from the amplifier ampX1 can be controlled by changing the resistance value of the feedback resistance Rref.

The voltage value Vout that is output from the amplifier ampX1 is input to a comparator CMP1 of the comparison unit 123 and compared with an arbitrary threshold voltage Vth. If the voltage value Vout that is output from the amplifier ampX1 exceeds the threshold voltage Vth when radiation is irradiated and a current flows to the radiation detection sensor 121, the comparator CMP1 sets the radiation detection signal SIGA to the high level and outputs the radiation detection signal SIGA to the radiation determination unit 127. The radiation determination unit 127 determines the radiation irradiation state based on the radiation detection signal SIGA, and upon determining that irradiation of radiation has started, sets the radiation determination signal SIGB to the high level and outputs the radiation determination signal SIGB. The radiation determination signal SIGB that was set to the high level is sent to the signal processing unit 105, and as a result the imaging apparatus 100 transitions to an accumulation operation.

Thereafter, when irradiation of radiation ends, the voltage value Vout that is output from the amplifier ampX1 becomes less than the threshold voltage Vth, and the comparator CMP1 sets the radiation detection signal SIGA to the low level and outputs the radiation detection signal SIGA to the radiation determination unit 127. The radiation determination unit 127 determines the radiation irradiation state based on the radiation detection signal SIGA, and upon determining that irradiation of radiation has ended, sets the radiation determination signal SIGB to the low level and outputs the radiation determination signal SIGB. The radiation determination signal SIGB that was set to the low level is sent to the signal processing unit 105, and as a result the imaging apparatus 100 transitions to a read operation.

In the present embodiment, radiation detection sensors 121 are arranged at a plurality of locations in the detection unit 101. Further, the gain of each current detection unit 122 and the threshold voltage Vth of each comparison unit 123 are set in accordance with the arrangement locations of the radiation detection sensors 121 with which the respective current detection units 122 and comparison units 123 are connected. In this case, in the current detection unit 122, the resistance value of the feedback resistance Rref is set so that an output voltage of the amplifier ampX1 remains within a dynamic range in which the amplifier ampX1 operates normally. Normally, based on the relation Vout=Rref×iPD, the resistance value of the feedback resistance Rref is set so that the voltage value Vout that is output from the amplifier ampX1 is a value from several tens of millivolts (mV) to several volts (V). A value of approximately $10^5 \Omega$ to $10^9 \Omega$ is used as the feedback resistance Rref.

A method of setting the gain of the current detection unit 122 and the threshold voltage Vth of the comparison unit 123 is described hereunder. During radiographing, the detection unit 101 includes a subject region at which radiation passes through the subject, and a direct transmission region at which radiation does not pass though the subject. In a subject region, because radiation is absorbed by the subject, the radiation amount that reaches the detection unit 101 is low in comparison to a direct transmission region, and hence a radiation input amount to radiation detection sensors 121 arranged in a subject region is small. In contrast, since the radiation amount that reaches the detection unit 101 in a direct transmission region is high, a radiation input amount to radiation detection sensors 121 arranged in a direct transmission region is large. Therefore, according to the present embodiment, optimal gain setting is performed in accordance with the arrangement positions of the radiation detection sensors 121 in the detection unit 101.

As described above, the start of irradiation of radiation is detected by detecting that the voltage value Vout that is output from the amplifier ampX1 exceeds the threshold voltage Vth. The detection performance of the radiation detection unit 120 depends on the following points.

Noise
Time response
SN ratio

Here, the term "noise" refers to, for example, a dark current of the radiation detection sensor 121, thermal noise of the feedback resistance Rref, an input offset current of the amplifier ampX1, and an input offset voltage of the comparator CMP1 and the like. In the radiation detection unit 120 illustrated in FIG. 4, as a characteristic of these kinds of noise, a dark current of the radiation detection sensor 121 or an input offset current of the amplifier ampX1 is amplified in proportion to a gain that corresponds to the resistance value of the feedback resistance Rref. In contrast, thermal noise of the feedback resistance Rref or an input offset voltage of the comparator CMP1 is not amplified in proportion to a gain that corresponds to the resistance value of the feedback resistance Rref. That is, the noise of the radiation detection unit 120 includes noise that is amplified in proportion to a gain of the current detection unit 122 and noise that is not amplified in proportion to a gain thereof. Therefore, the entire amount of the noise of the radiation detection unit 120 is not amplified in proportion to the gain current detection unit 122.

Figure 5:
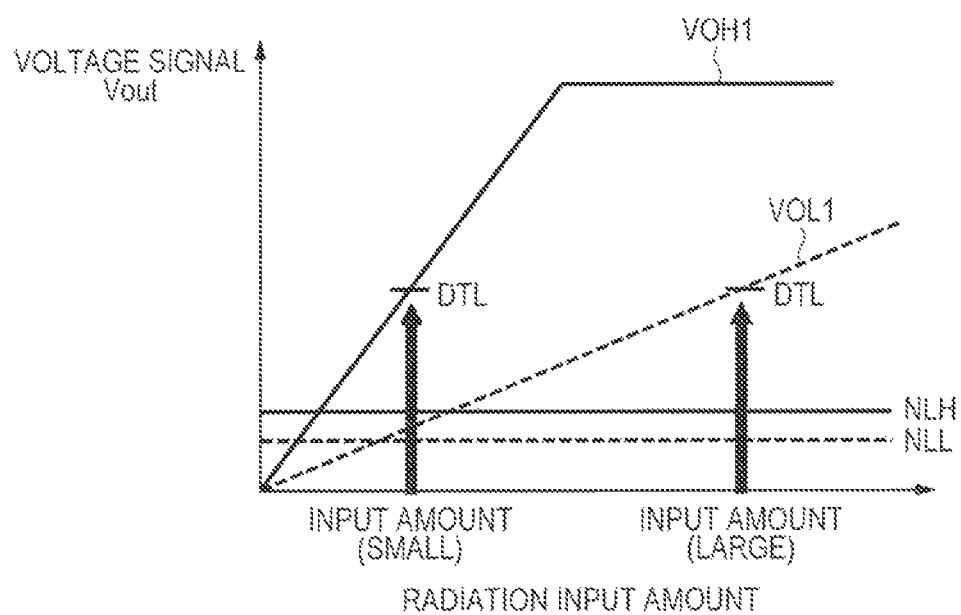
FIG. 5 is a conceptual diagram that illustrates input-output characteristics in accordance with a gain setting of a current detection unit.

FIG. 5 illustrates a conceptual diagram of two kinds of input-output characteristics for a case where a gain setting of the current detection unit 122 is low and a case where the gain setting is high. In FIG. 5, reference character VOL1 denotes the input-output characteristics when the gain setting of the current detection unit 122 is low, and reference character VOH1 denotes the input-output characteristics when the gain setting of the current detection unit 122 is high. Further, reference character NLL denotes a noise level when the gain setting of the current detection unit 122 is low, and reference character NLH denotes a noise level when the gain setting of the current detection unit 122 is high.

In a case where the radiation input amount to the radiation detection sensor 121 is small, if the gain setting of the current detection unit 122 is low, the proportion of the noise level with respect to the voltage value Vout that is output from the amplifier ampX1 is large. That is, the SN ratio is small. In contrast, if the gain setting of the current detection unit 122 is high, the proportion of the noise level is small. That is, the SN ratio is large. Accordingly, by setting the gain of the current detection unit 122 to a high value, the SN ratio at the radiation detection unit 120 can be raised. Here, the term "SN ratio" refers to a ratio obtained by dividing the voltage value Vout that is output from the amplifier ampX1 by the sum total of the noise.

However, when the gain of the current detection unit 122 is set to a high value, a time constant value of the amplifier ampX1 increases, and the time response of the voltage value Vout deteriorates. Consequently, there is a possibility that a time period from when radiation irradiation is actually started until the start of radiation irradiation is detected at the radiation detection unit 120 will increase. Further, when detecting the end of radiation also, there is a possibility that a time period from when radiation irradiation is actually ended until the end of radiation irradiation is detected will increase.

Therefore, according to the present embodiment, in a case where the radiation input amount to the radiation detection sensor 121 is small, the gain setting of the current detection unit 122 is set to a high value to raise the SN ratio of the radiation detection unit 120. That is, the resistance value of the feedback resistance Rref is made a large value. As a result, even in a case where a radiation input amount to the radiation detection sensor 121 is small, erroneous detection of radiation irradiation due to noise can be prevented. In contrast, in a case where a radiation input amount to the radiation detection sensor 121 is large, since the SN ratio of the radiation detection unit 120 is large and there is a low possibility of radiation irradiation being erroneously detected due to noise, it is not necessary to set the gain of the current detection unit 122 to a high value. Further, if the gain of the current detection unit 122 is unnecessarily set to a high value, the time response deteriorates and leads to the aforementioned adverse effects. Therefore, in a case where a radiation input amount to the radiation detection sensor 121 is large, the gain setting of the current detection unit 122 is lowered.

As described above, the radiation input amount to the radiation detection sensor 121 arranged in the subject region in the detection unit 101 is small, and the radiation input amount to the radiation detection sensor 121 arranged in the direct transmission region in the detection unit 101 is large. Therefore, in the present embodiment, the gain of the current detection unit 122 connected to the radiation detection sensor 121 arranged in the center region of the detection unit 101 that has a high possibility of being a subject region is set to a high value. Further, the gain of the current detection unit 122 that is connected to the radiation detection sensor 121 arranged in a peripheral region of the detection unit 101 that has a high possibility of being a direct transmission region is set to a low value. Normally, radiation that is irradiated at the direct transmission region is stronger by a multiple of approximately two to three digits relative to radiation that is irradiated at the subject region. Therefore, for example, the gain of the current detection unit 122 that corresponds to a center region is set to a value that is higher by a multiple of approximately two to three digits relative to the gain of the current detection unit 122 that corresponds to a peripheral region.

Figure 6:
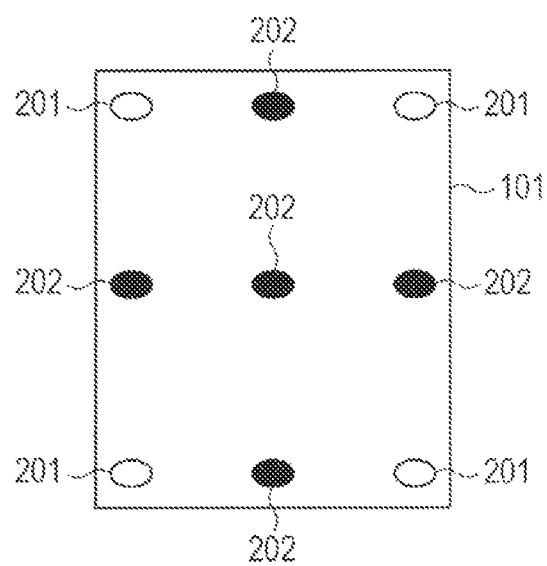
FIG. 6 is a view for describing an example of gain setting in accordance with the arrangement of radiation detection sensors.

A gain setting example in a case where radiation detection sensors are arranged at nine places in the detection unit will now be described using FIG. 6. As shown in FIG. 6, in various kinds of radiographing, there is a high possibility that the peripheral four corners within the detection unit 101 will be direct transmission regions. Therefore, the gain of the current detection units 122 to which radiation detection sensors 201 that are arranged at the peripheral four corners within the detection unit 101 are connected is set to a low value. Further, since there is a high possibility that the other five places will be subject regions, the gain of the current detection units 122 to which radiation detection sensors 202 that are arranged at those five positions are connected is set to a high value. Further, depending on the radiographing site or the radiographing mode, such as a still image or moving image radiographing mode, in some cases the irradiation field of radiation is narrowed. In such cases, even if radiation irradiation is performed, the radiation detection sensors 121 that are arranged at a peripheral region of the detection unit 101 cannot detect the radiation if the radiation is outside the irradiation field. Therefore, among two or more radiation detection sensors that are arranged within the detection unit 101, at least one radiation detection sensor is arranged at the center region of the detection unit 101, and the gain of the current detection unit 122 that is connected thereto is set to a high value.

Further, the threshold voltage Vth of the comparison unit 123 changes according to the gain setting of the current detection unit 122. As described above, at a place (center region) where the gain setting of the current detection unit 122 is high, since the amount of noise that is superimposed on the voltage value Vout that is output from the amplifier ampX1 is large, the threshold voltage Vth of the comparison unit 123 is set to a high value from the viewpoint of preventing erroneous detection. Further, at a place (peripheral region) where the gain setting of the current detection unit 122 is low, since the amount of noise that is superimposed on the voltage value Vout that is output from the amplifier ampX1 is small, the threshold voltage Vth of the comparison unit 123 is set to a low value. The lower that the threshold voltage Vth of the comparison unit 123 is, the shorter the time that is taken for the radiation detection unit 120 to detect the start of radiation irradiation after irradiation of radiation is started. Therefore, it is desirable to set the threshold voltage Vth as low as possible.

Figure 7A:
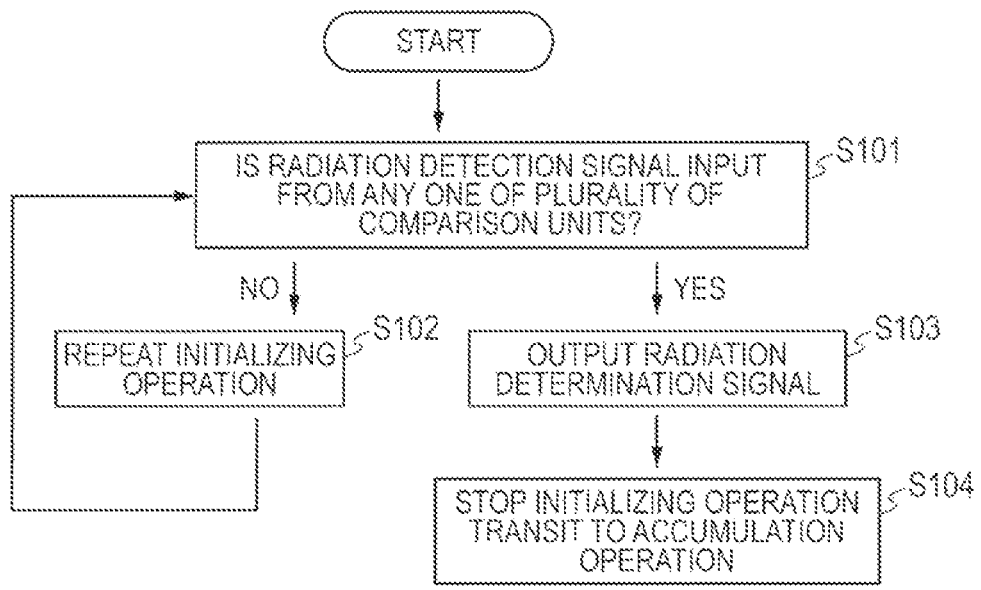
FIGS. 7A and 7B are flowcharts that illustrate examples of operations to detect radiation irradiation at the radiation imaging apparatus according to the first embodiment.
Figure 7B:
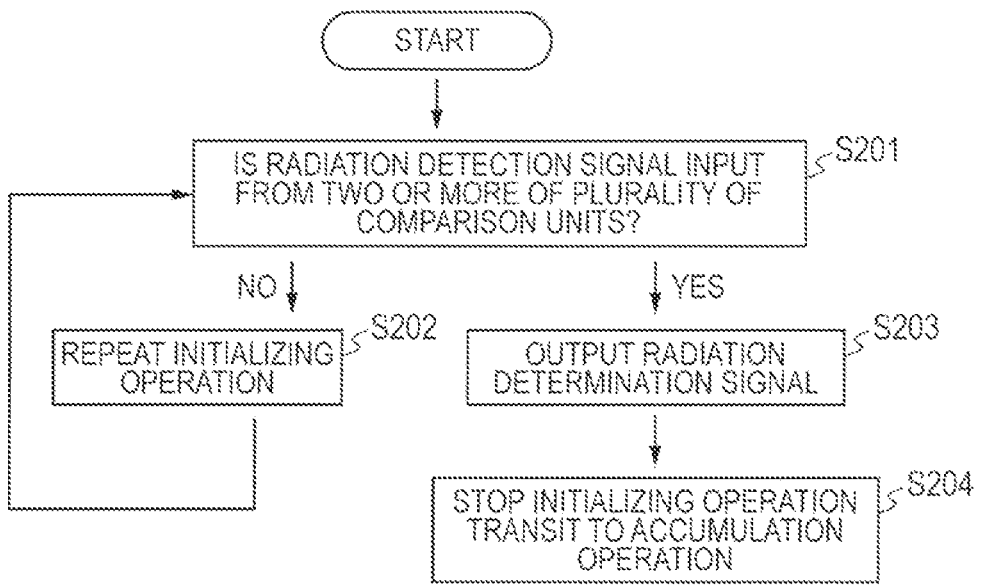

FIGS. 7A and 7B are flowcharts that illustrate examples of operations to detect radiation irradiation at the radiation imaging apparatus according to the first embodiment. FIG. 7A is a flowchart that illustrates a first example of operations to detect radiation irradiation. When the imaging apparatus 100 starts a standby operation, the radiation determination unit 127 determines whether or not any one radiation detection signal SIGA among radiation detection signals SIGA from a plurality of the comparison units 123 of the radiation detection unit 120 is input in a state that indicates the start of irradiation of radiation. In other words, the radiation determination unit 127 determines whether any one radiation detection signal SIGA changed from a low level to a high level (S101). If it is determined as a result that all of the radiation detection signals SIGA are not in a state that indicates the start of irradiation of radiation, the radiation determination unit 127 outputs a radiation determination signal SIGB that indicates that radiation irradiation is not detected to the signal processing unit 105. As a result, the imaging apparatus 100 continues the standby operation, and repeatedly performs an initializing operation (S102).

In contrast, in a case where any one of the radiation detection signals SIGA changed to a high level, which is a state that indicates the start of irradiation of radiation, the radiation determination unit 127 outputs a radiation determination signal SIGB that indicates the start of irradiation of radiation to the signal processing unit 105 (S103). Upon receiving the radiation determination signal SIGB that indicates the start of irradiation of radiation, the signal processing unit 105 sends a signal for stopping the initializing operation and transitioning to an accumulation operation to the control unit 106. As a result, the imaging apparatus 100 stops the initializing operation and transitions to the accumulation operation (S104).

FIG. 7B is a flowchart illustrating a second example of operations to detect radiation irradiation. When the imaging apparatus 100 starts a standby operation, the radiation determination unit 127 determines whether or not two or more radiation detection signals SIGA among radiation detection signals SIGA from a plurality of the comparison units 123 of the radiation detection unit 120 are input in a state that indicates the start of irradiation of radiation. In other words, the radiation determination unit 127 determines whether two or more radiation detection signals SIGA changed from a low level to a high level (S201). If it is determined as a result that there are not two or more of the radiation detection signals SIGA that are in a state that indicates the start of irradiation of radiation, the radiation determination unit 127 outputs a radiation determination signal SIGB that indicates that radiation irradiation is not detected to the signal processing unit 105. As a result, the imaging apparatus 100 continues the standby operation, and repeatedly performs an initializing operation (S202).

In contrast, in a case where two or more of the radiation detection signals SIGA are in a state that indicates the start of irradiation of radiation, the radiation determination unit 127 outputs a radiation determination signal SIGB that indicates the start of irradiation of radiation to the signal processing unit 105 (S203). Upon receiving the radiation determination signal SIGB that indicates the start of irradiation of radiation, the signal processing unit 105 sends a signal for stopping the initializing operation and transitioning to an accumulation operation to the control unit 106. As a result, the imaging apparatus 100 stops the initializing operation and transitions to the accumulation operation (S204).

Thus, a configuration may be adopted in which, as shown in FIG. 7A, when any one signal among a plurality of radiation detection signals SIGA is input in a state that indicates the start of irradiation of radiation, the radiation determination unit 127 immediately outputs a radiation determination signal SIGB that indicates the start of irradiation of radiation. In this case, since a radiation detection signal that detects the start of radiation irradiation and is output fastest from among the radiation detection signals relating to the plurality of radiation detection sensors 121 is used, a time period from the start of irradiation of radiation until the irradiation of radiation is detected by the radiation detection unit 120 can be shortened.

In addition, a configuration may also be adopted in which, as shown in FIG. 7B, when two or more signals among a plurality of radiation detection signals SIGA are input in a state that indicates the start of irradiation of radiation, the radiation determination unit 127 outputs a radiation determination signal SIGB that indicates the start of irradiation of radiation. In this case, since two or more radiation detection signals are used, the occurrence of erroneous detection can be reduced and it is possible to accurately detect radiation irradiation.

Figure 8:
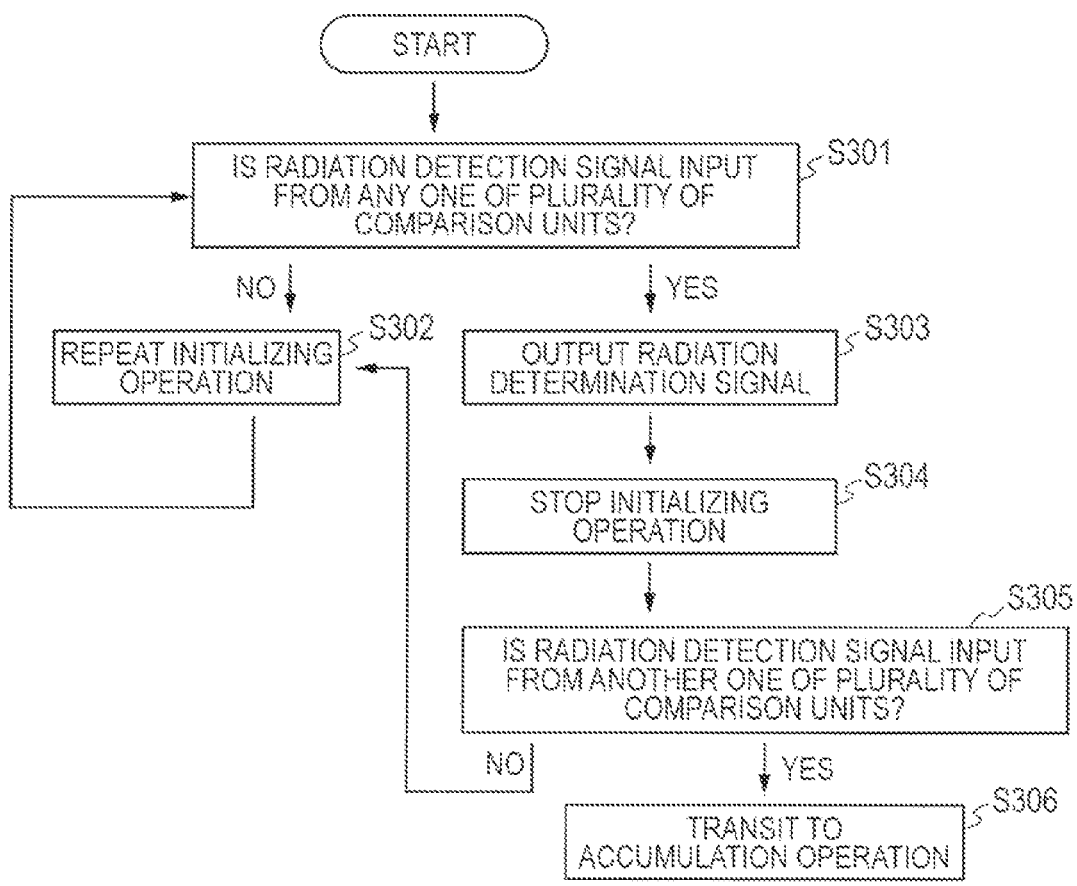
FIG. 8 is a flowchart that illustrates an example of an operation to detect radiation irradiation at the radiation imaging apparatus according to the first embodiment.

Further, a configuration may also be adopted in which the following operations to detect radiation irradiation are performed. FIG. 8 is a flowchart that illustrates a third example of operations to detect radiation irradiation in the radiation imaging apparatus according to the first embodiment. When the imaging apparatus 100 starts a standby operation, the radiation determination unit 127 determines whether or not any one radiation detection signal SIGA among radiation detection signals SIGA from a plurality of the comparison units 123 of the radiation detection unit 120 is input in a state that indicates the start of irradiation of radiation (S301). If it is determined as a result that all of the radiation detection signals SIGA are not in a state that indicates the start of irradiation of radiation, the radiation determination unit 127 outputs a radiation determination signal SIGB that indicates that radiation irradiation is not detected to the signal processing unit 105. As a result, the imaging apparatus 100 continues the standby operation, and repeatedly performs an initializing operation (S302).

In contrast, in a case where any one of the radiation detection signals SIGA is in a state that indicates the start of irradiation of radiation, the radiation determination unit 127 outputs a radiation determination signal SIGB that indicates the start of irradiation of radiation to the signal processing unit 105 (S303). Upon receiving the radiation determination signal SIGB that indicates the start of irradiation of radiation, the signal processing unit 105 sends a signal for stopping the initializing operation to the control unit 106. As a result, the imaging apparatus 100 stops the initializing operation (S304).

Next, the radiation determination unit 127 determines whether or not another one of the radiation detection signals SIGA from the plurality of comparison units 123 is input in a state that indicates the start of irradiation of radiation (S305). If it is determined as a result that another radiation detection signal SIGA is input in a state that indicates the start of irradiation of radiation, the signal processing unit 105 sends a signal for transitioning to an accumulation operation to the control unit 106. As a result, the imaging apparatus 100 transitions to the accumulation operation (S306).

On the other hand, if another one of the radiation detection signals SIGA is not input in a state that indicates the start of irradiation of radiation during a predetermined time period, the radiation determination unit 127 determines that the start of irradiation of radiation was erroneously detected. Subsequently, the radiation determination unit 127 outputs a radiation determination signal SIGB for causing the imaging apparatus 100 to resume the standby operation to the signal processing unit 105. Upon receiving the radiation determination signal SIGB, the signal processing unit 105 sends a signal for transitioning to the standby operation to the control unit 106. As a result, the imaging apparatus 100 transitions to the standby operation and resumes the initializing operation.

Thus, when any one radiation detection signal SIGA is input in a state that indicates the start of irradiation of radiation, the radiation determination unit 127 outputs a radiation determination signal SIGB that indicates the start of irradiation of radiation to temporarily stop an initializing operation of the imaging apparatus 100. Thereafter, if a second radiation detection signal SIGA in a state that indicates the start of irradiation of radiation is input to the radiation determination unit 127, the imaging apparatus 100 transitions to an accumulation operation. If a second radiation detection signal SIGA in a state that indicates the start of irradiation of radiation is not input to the radiation determination unit 127, the radiation determination unit 127 determines that there was an erroneous detection and sends a signal to the imaging apparatus 100 so as to cause the imaging apparatus 100 to resume a standby driving operation, that is, the initializing operation. It is thereby possible to reduce the occurrence of erroneous detection of the start of radiation irradiation and to also lessen the outflow of signals from the conversion elements 201 caused by an initializing operation.

According to the present embodiment, the radiation detection sensors 121 are arranged at two or more positions in the detection unit. The gain of the current detection unit 122 that is connected to the radiation detection sensor 121 arranged in the center region for which the possibility of being a subject region is high is set to a high value. The gain of the current detection unit 122 that is connected to the radiation detection sensor 121 arranged at a peripheral region for which the possibility of being a direct transmission region is high is set to a low value. Further, the threshold voltage Vth of the comparison unit 123 corresponding to the radiation detection sensor 121 arranged in the center region (subject region) is set to a high value, and the threshold voltage Vth of the comparison unit 123 corresponding to the radiation detection sensor 121 arranged in the peripheral region (direct transmission region) is set to a low value. By setting the gain of the current detection units 122 and setting the threshold voltage of the comparison units 123 in accordance with the arrangement positions of the radiation detection sensors 121 in this manner, erroneous detection due to noise and a deterioration in the time response of the detection system due to an excessive gain setting can be prevented. It is thereby possible to realize a radiation imaging apparatus in which irradiation of radiation is detected with high accuracy.

Figure 9:
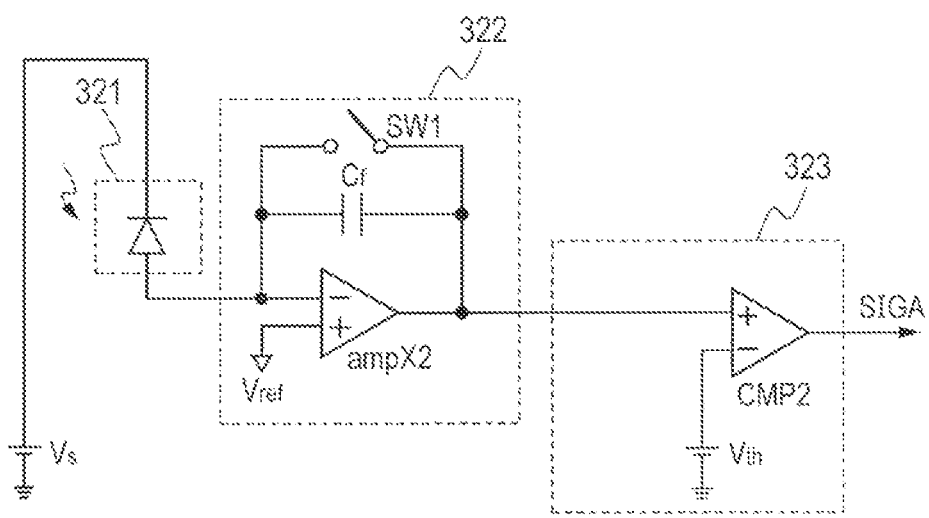
FIG. 9 is a view that illustrates another configuration example of a radiation detection unit according to the first embodiment.

Although in the above description, the radiation detection sensors 121 that are arranged in the detection unit 101 are used, a configuration may also be adopted so as to detect the irradiation of radiation by providing radiation detecting pixels 321 separately to pixels for radiographing an image that are provided for acquiring image data in the detection unit 101. FIG. 9 is a view that illustrates another configuration example of the radiation detection unit 120 according to the first embodiment. The radiation detection unit 120 illustrated in FIG. 9 includes a radiation detecting pixel 321, an integrating circuit 322, and a comparison unit 323.

The radiation detecting pixel 321, for example, includes an MIS sensor that was made using a-Si. In a case where the radiation detecting pixel 321 is provided in the detection unit 101, instead of the above described gain setting of the current detection unit 122, the sensitivity of the radiation detecting pixel 321 is set. The sensitivity of the radiation detecting pixel 321 is set by means of a bias voltage value Vs. In a sensor made using a-Si, there are a large number of trap levels produced by dangling bonds because the sensor is an amorphous semiconductor, and hence the movement of electrons and holes caused by traps becomes active depending on the electric field intensity inside the semiconductor, and the sensitivity can be changed by the bias voltage value Vs.

When radiation is irradiated on the radiation detecting pixel 321, a photocharge is generated and is accumulated in a feedback capacitor Cf that is connected between an inverting input terminal and an output terminal of an amplifier ampX2 of the integrating circuit 322. Note that the reference voltage Vref is input to a non-inverting input terminal of the amplifier ampX2. A voltage value Vout that corresponds to the accumulated charge of the feedback capacitor Cf is input to a comparator CMP2 of the comparison unit 323, and compared with an arbitrary threshold voltage Vth. If the voltage value Vout exceeds the threshold voltage Vth, the comparator CMP2 sets the radiation detection signal SIGA to a high level and outputs the radiation detection signal SIGA. When radiation detection ends, a switch SW1 that is connected between the inverting input terminal and the output terminal of the amplifier ampX2 of the integrating circuit 322 is placed in a conductive state and the radiation detecting pixel 321 is refreshed.

In the case of using the radiation detection unit 120 illustrated in FIG. 9 also, the sensitivity is set in accordance with the arrangement position of the radiation detecting pixel 321. The sensitivity is set to a high value (the bias voltage value Vs is set to a high value) with respect to the radiation detecting pixel 321 arranged at a center region at which a radiation input amount to the radiation detecting pixel 321 is small. Further, the sensitivity is set to a low value (the bias voltage value Vs is set to a low value) with respect to the radiation detecting pixel 321 that is arranged at a peripheral region at which a radiation input amount to the radiation detecting pixel 321 is large. Note that as the method of setting the sensitivity of the radiation detecting pixels 321, a method may also be adopted that varies the light-receiving areas of the respective radiation detecting pixel 321. That is, the light-receiving area of the radiation detecting pixel 321 at a center region is made large to increase the sensitivity, and the light-receiving area of the radiation detecting pixel 321 at a peripheral region is made small to lower the sensitivity.

Further, in the present embodiment, detection of radiation irradiation may also be performed by detecting a current that flows in the bias line Bs of the detection unit 101. In such case, the bias line Bs is divided into two or more regions, and the above described current detection unit 122 and comparison unit 123 are connected to the two or more regions, respectively. A method of determining radiation irradiation in this case is the same as the method described above.

Second Embodiment

Figure 10:
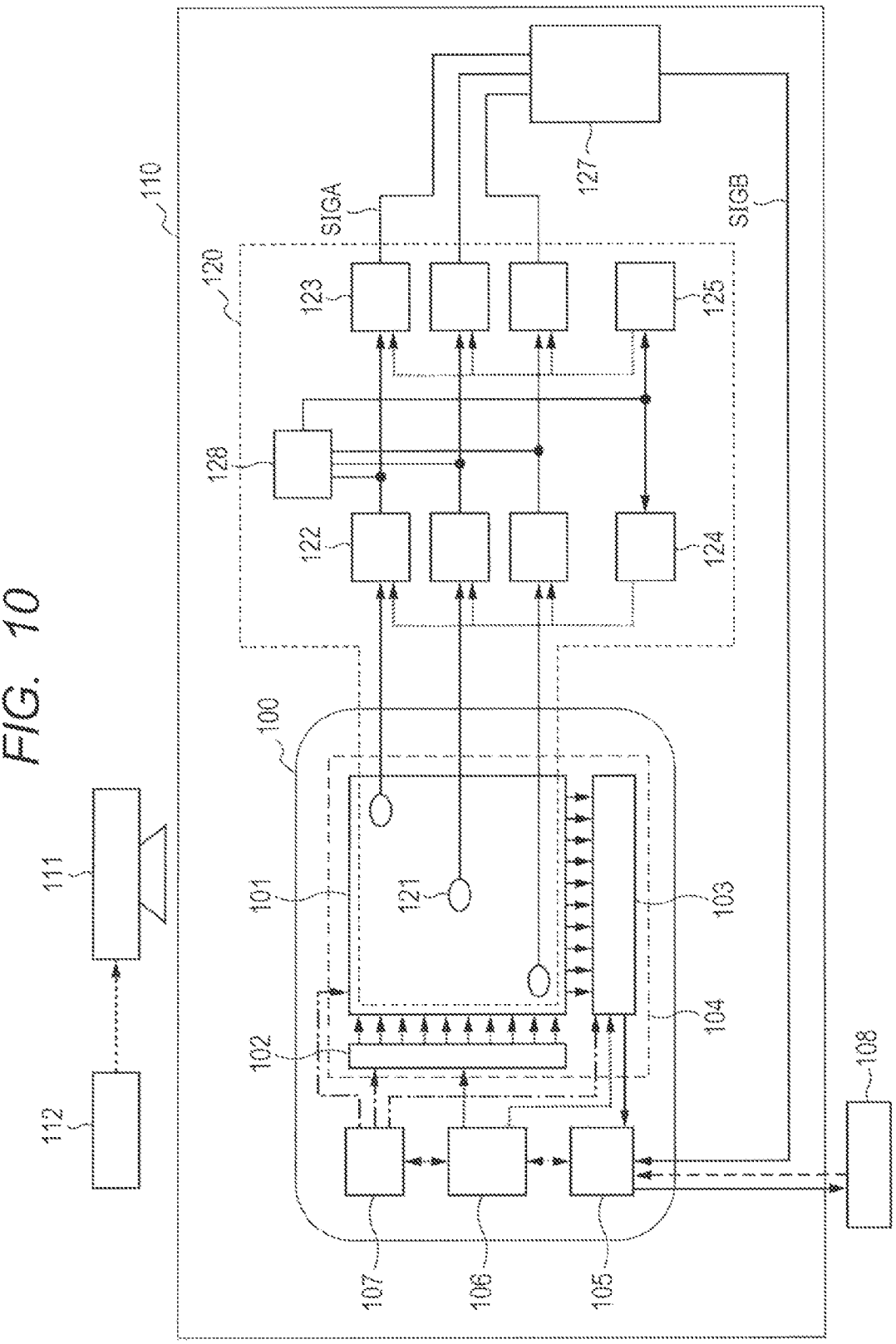
FIG. 10 is a view that illustrates a configuration example of a radiation imaging apparatus according to a second embodiment of the present invention.
Figure 11:
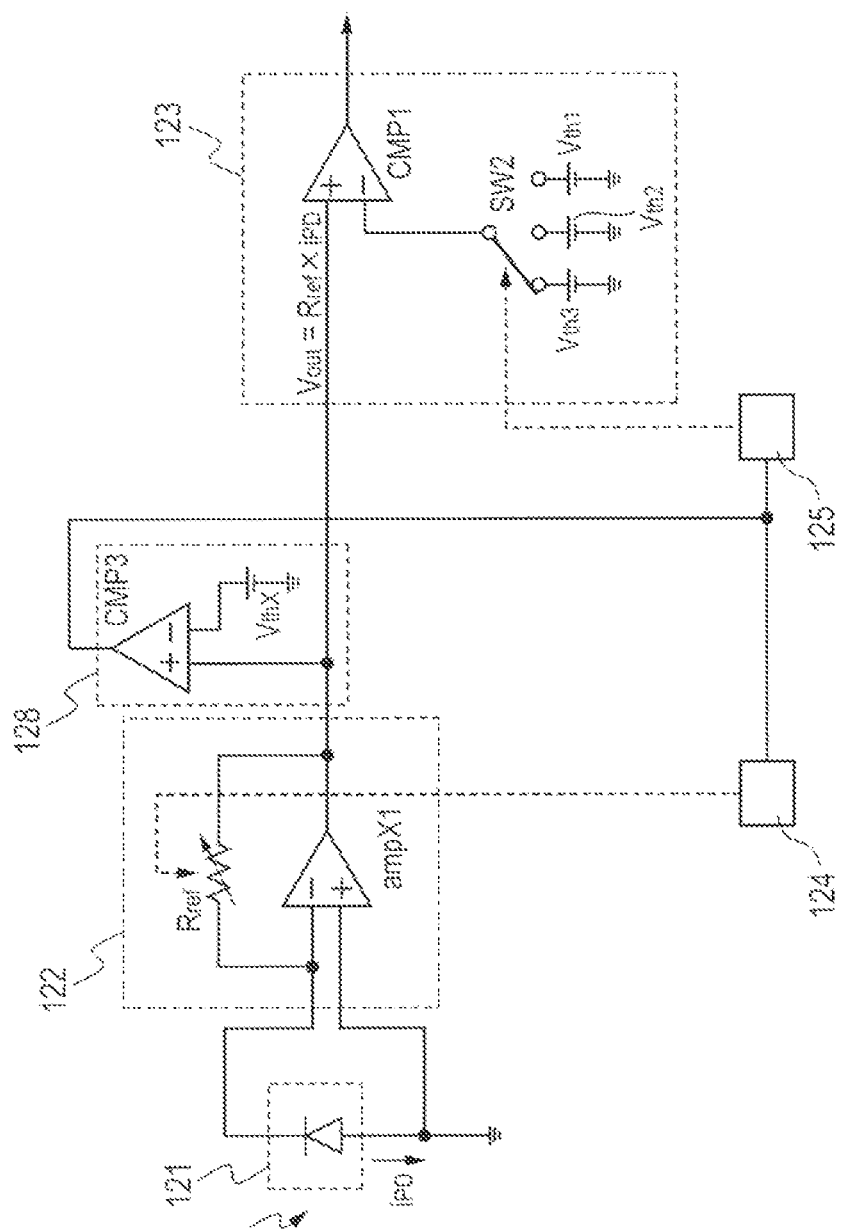
FIG. 11 is a view that illustrates a configuration example of a radiation detection unit according to the second embodiment.

Next, a second embodiment of the present invention will be described. FIG. 10 is a view illustrating a configuration example of a radiation imaging apparatus according to the second embodiment. FIG. 11 is a view illustrating a configuration example of a radiation detection unit according to the second embodiment. Elements in FIGS. 10 and 11 that have the same configuration as in the first embodiment are assigned the same reference numerals, and detailed descriptions thereof are omitted.

Differences between the second embodiment and the first embodiment are described below.

As illustrated in FIG. 10 and FIG. 11, according to the second embodiment, a saturation determination unit 128 is connected to the output of the amplifier ampX1 of each current detection unit 122. The saturation determination unit 128 includes a comparator CMP3 into which the voltage value Vout that is output from the amplifier ampX1 and a threshold voltage Vthx are input. A gain setting unit 124 and a threshold setting unit 125 are connected to an output terminal of the comparator CMP3 of the saturation determination unit 128. A configuration is adopted such that the gain of the current detection unit 122 and the threshold voltage of the comparison unit 123 can be switched based on a signal from the saturation determination unit 128. The feedback resistance Rref of the current detection unit 122 is made a variable resistance, and a resistance value thereof can be changed by a signal from the gain setting unit 124. To enable changing of the threshold voltage value of the comparator CMP1, the comparison unit 123 includes a plurality of power sources for the threshold voltage, and a switch SW2 can be controlled by a signal from the threshold setting unit 125 to change the threshold voltage value. Although FIG. 11 illustrates an example in which there are three power sources Vth1, Vth2, and Vth3 for the threshold voltage, the present embodiment is not limited thereto and the number of power sources for the threshold voltage is arbitrary.

In the first embodiment the detection capabilities of two or more radiation detection sensors 121 arranged in the detection unit 101 were set according to the arrangement locations of the respective radiation detection sensors 121. The gain was set to a high value with respect to the radiation detection sensor 121 arranged at a center region at which a radiation input amount to the radiation detection sensor 121 is small, while the gain was set to a low value with respect to the radiation detection sensor 121 arranged at a peripheral region at which a radiation input amount is large. However, in actual radiographing, since a subject region differs depending on the radiographing site and the build of the subject, in some cases the gain setting at the respective arrangement locations of the radiation detection sensor 121 is inappropriate. The following effects are conceivable as adverse effects in such a case. When excessively strong radiation is irradiated at the radiation detection sensor 121 for which the gain is set to a high value, the amplifier ampX1 inside the current detection unit 122 saturates and no longer operates normally. When the amplifier ampX1 saturates, the time response deteriorates and time is taken to detect the end of radiation irradiation, and the end of irradiation can no longer be detected accurately. Therefore, according to the second embodiment, the saturation determination unit 128 is connected to the output of the amplifier ampX1 and the gain is controlled so that the amplifier ampX1 does not saturate.

Figure 12:
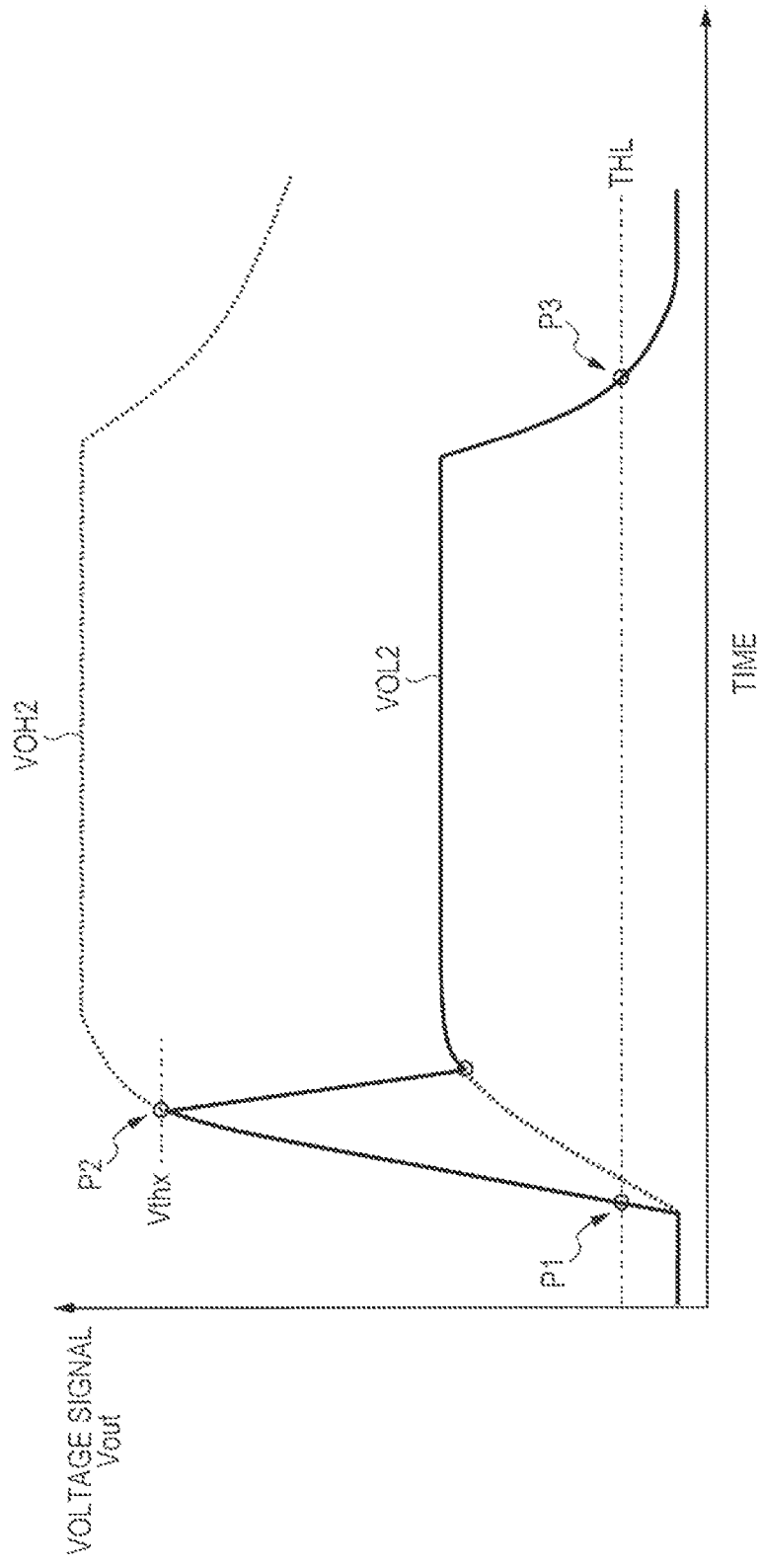
FIG. 12 is a view for describing gain setting according to the second embodiment.

The operations of the saturation determination unit 128 will now be described using FIG. 11 and FIG. 12. FIG. 12 is a view for describing gain setting according to the second embodiment. In FIG. 12, reference character VOL2 denotes an example of the voltage value Vout in a case where the gain setting of the current detection unit 122 is low, and reference character VOH2 denotes an example of the voltage value Vout in a case where the gain setting of the current detection unit 122 is high. Further, reference character Vthx denotes a threshold voltage of the saturation determination unit 128, and reference character THL denotes a threshold voltage of the comparison unit 123.

The start of radiation irradiation is detected when the voltage value Vout that is output from the amplifier ampX exceeds the threshold voltage THL of the comparison unit 123 (P1). The saturation determination unit 128 monitors the voltage value Vout that is output from the amplifier ampX, and when the voltage value Vout exceeds the threshold voltage Vthx (P2) that is set to a lower voltage than the saturation voltage, the saturation determination unit 128 sends a saturation determination signal to the gain setting unit 124. Upon receiving the saturation determination signal, the gain setting unit 124 lowers the resistance value of the feedback resistance Rref of the current detection unit 122. That is, the gain setting unit 124 sets the gain of the current detection unit 122 to a low value. By performing this operation, saturation of the amplifier ampX1 can be prevented, and the timing of the end of radiation irradiation can be accurately detected.

Further, when the voltage value Vout that is output from the amplifier ampX1 is less than the threshold voltage THL (P2), the comparison unit 123 sends a radiation detection signal SIGA that indicates detection of the end of radiation irradiation to the radiation determination unit 127. In this case, it is desirable that the threshold voltage THL of the comparison unit 123 is set to a low value by a signal from the threshold setting unit 125 that received the saturation determination signal. This is because, since the gain of the current detection unit 122 that receives the saturation determination signal is set to a low value, there is a possibility that the voltage value Vout that is output from the amplifier ampX1 will become less than the threshold voltage THL before detecting the actual end of the radiation irradiation.

Figure 13:
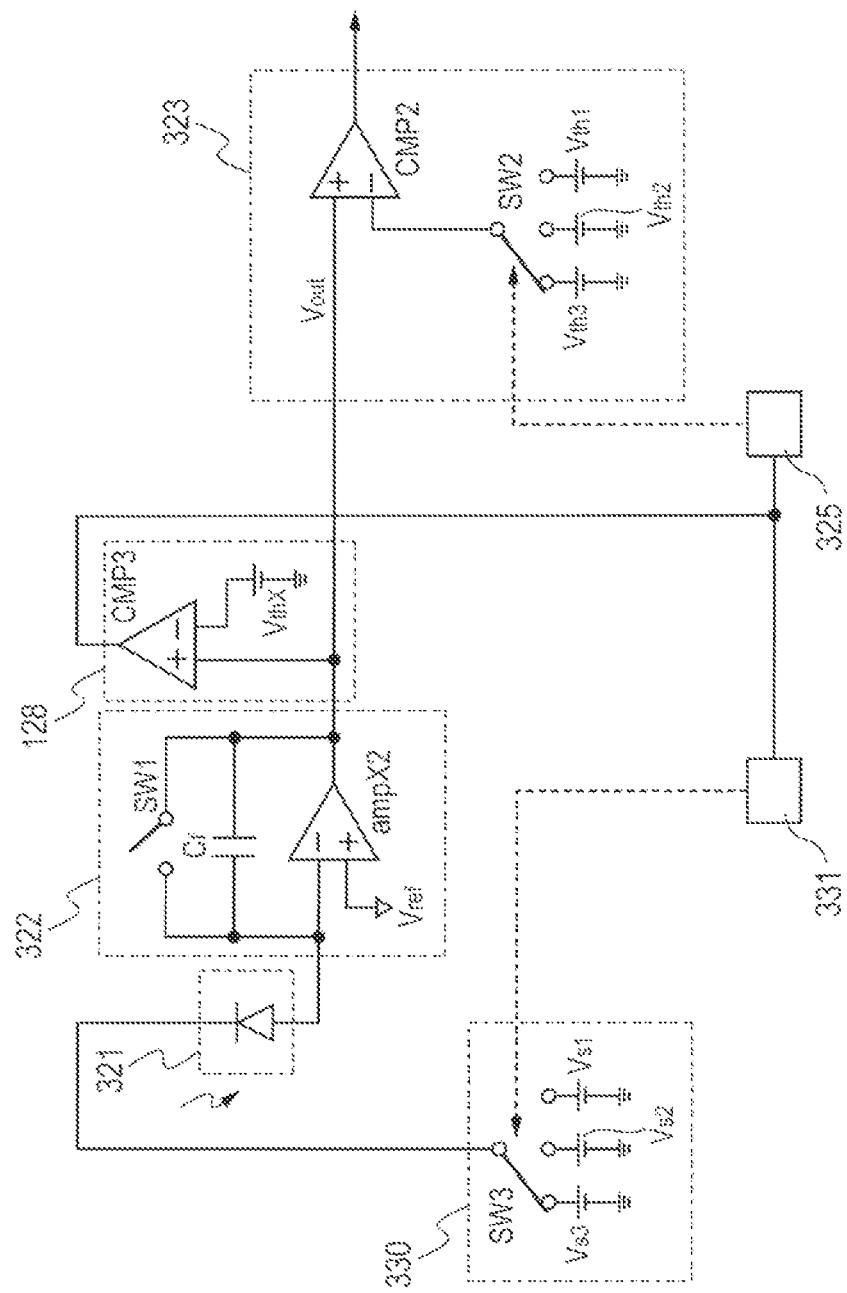
FIG. 13 is a view that illustrates another configuration example of a radiation detection unit according to the second embodiment.

Note that, similarly to the first embodiment, a configuration may also be adopted so as to detect the irradiation of radiation by providing radiation detecting pixels 321 separately to pixels for radiographing an image that are provided in the detection unit 101. FIG. 13 is a view that illustrates another configuration example of the radiation detection unit 120 according to the second embodiment. Elements in FIG. 13 having the same configuration as that described with reference to FIG. 9 and FIG. 11 are assigned the same reference numerals, and detailed descriptions thereof are omitted. The radiation detection unit 120 illustrated in FIG. 13 includes the radiation detecting pixel 321, the integrating circuit 322, the comparison unit 323, the saturation determination unit 128, a threshold setting unit 325, a bias switching unit 330, and a bias setting unit 331.

When using the radiation detecting pixels 321, a configuration is adopted so that, instead of the gain setting of the current detection unit 122, the sensitivity of the radiation detecting pixels 321 can be set, respectively, and in which the saturation determination unit 128 is connected to the output of the integrating circuit 322. The saturation determination unit 128 monitors the voltage value Vout that is output from the amplifier ampX2 of the integrating circuit 322, and if the voltage value Vout exceeds the threshold voltage Vthx that is set to a lower voltage than a voltage at which the radiation detecting pixel 321 saturates, the saturation determination unit 128 sends a saturation determination signal to the bias setting unit 331. Upon receiving the saturation determination signal, the bias setting unit 331 controls a switch SW3 of the bias switching unit 330 to lower the bias voltage. That is, the bias setting unit 331 lowers the sensitivity of the radiation detecting pixel 321. It is thereby possible to prevent the occurrence of a situation in which the radiation detecting pixel 321 saturates and the time response deteriorates.

OTHER EMBODIMENTS

The present invention can also be realized by supplying software (a program) for realizing the functions of the above embodiments to a system or an apparatus via a network or via various storage media, and having a computer (or a central processing unit (CPU) or a micro processing unit (MPU)) of the system or apparatus read and execute the program.

It is to be understood that the foregoing embodiments are intended to merely illustrate specific examples of the present invention, and are not intended to limit the technical scope of the present invention. That is, the present invention can be implemented in various forms without departing from the technical concept or the principal features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192416, filed Aug. 31, 2012, which is hereby incorporated by reference herein in its entirety.

What is claimed is:

1. A radiation imaging apparatus comprising:
a detector including a detection unit in which pixels having a conversion element that converts radiation into an electric charge are arranged in a matrix shape, a drive circuit configured to drive the detection unit to output electric signals that correspond to the electric charges from the pixels, and a read circuit configured to output the electric signals as image data;
a radiation detection unit configured to detect an irradiation state of radiation at a plurality of positions in the detection unit such that the irradiation state of radiation at least at a center region in the detection unit and at a peripheral region in the detection unit that is separated from the center region is detected, the irradiation state of radiation being different from the image data; and
a control unit configured to control operations of the drive circuit and the read circuit in accordance with a detection result obtained by the radiation detection unit,
wherein the radiation detection unit is configured to have a plurality of sensitivities such that the sensitivity at the center region in the detection unit is greater than the sensitivity at the peripheral region in the detection unit.

2. The radiation imaging apparatus according to claim 1, wherein:
when a start of irradiation of radiation is detected by the radiation detection unit, the control unit makes an operating state of the detector transition from a standby state in which the detector repeatedly performs resetting of the conversion elements to an accumulation state in which the detector accumulates the electric charges in the conversion elements, and
when an end of irradiation of radiation is detected by the radiation detection unit, the control unit makes the operating state of the detector transition from the accumulation state to a read state in which the detector outputs electric signals that correspond to the electric charges that are accumulated in the conversion elements.

3. The radiation imaging apparatus according to claim 1, wherein the radiation detection unit comprises:
a radiation detection sensor that is arranged in the detection unit and is configured to convert irradiated radiation to a current signal;
a current detection unit configured to convert the current signal from the radiation detection sensor to a voltage signal; and
a comparison unit configured to compare the voltage signal from the current detection unit and a threshold voltage,
wherein, when the voltage signal from the current detection unit exceeds the threshold voltage of the comparison unit, the radiation detection unit outputs a radiation detection signal indicating a start of irradiation of radiation, and when the voltage signal from the current detection unit is less than the threshold voltage of the comparison unit, the radiation detection unit outputs the radiation detection signal that indicates an end of irradiation of radiation, wherein the threshold voltage is changed according to at least one of the plurality sensitivities of the radiation detection unit, and wherein each of the plurality sensitivities of the radiation detection unit comprises a sensitivity of the radiation detection sensor and a gain of the current detection unit.

4. The radiation imaging apparatus according to claim 3, further comprising a radiation determination unit configured to receive from the radiation detection unit a plurality of the radiation detection signals that respectively correspond to a plurality of the radiation detection sensors that are arranged in the detection unit, and determine a radiation irradiation state, wherein, when any one of the radiation detection signals that indicates a start of irradiation of radiation is input from the radiation detection unit, the radiation determination unit outputs a radiation determination signal that indicates a start of irradiation of radiation to the control unit.

5. The radiation imaging apparatus according to claim 4, wherein, when any one of the radiation detection signals that indicates an end of irradiation of radiation is input from the radiation detection unit, the radiation determination unit outputs a radiation determination signal that indicates an end of irradiation of radiation to the control unit.

6. The radiation imaging apparatus according to claim 4, wherein, when two or more of the radiation detection signals that indicate an end of irradiation of radiation are input from the radiation detection unit, the radiation determination unit sends a radiation determination signal that indicates an end of irradiation of radiation to the control unit.

7. The radiation imaging apparatus according to claim 3, further comprising a radiation determination unit configured to receive from the radiation detection unit a plurality of the radiation detection signals that respectively correspond to a plurality of the radiation detection sensors that are arranged in the detection unit, and determine a radiation irradiation state, wherein, when two or more of the radiation detection signals that indicate a start of irradiation of radiation are input from the radiation detection unit, the radiation determination unit outputs a radiation determination signal that indicates a start of irradiation of radiation to the control unit.

8. The radiation imaging apparatus according to claim 7, wherein, when any one of the radiation detection signals that indicates an end of irradiation of radiation is input from the radiation detection unit, the radiation determination unit outputs a radiation determination signal that indicates an end of irradiation of radiation to the control unit.

9. The radiation imaging apparatus according to claim 7, wherein, when two or more of the radiation detection signals that indicate an end of irradiation of radiation are input from the radiation detection unit, the radiation determination unit sends a radiation determination signal that indicates an end of irradiation of radiation to the control unit.

10. The radiation imaging apparatus according to claim 1, wherein the radiation detection unit comprises:

a radiation detection sensor that is arranged in the detection unit and is configured to convert irradiated radiation to a current signal;

a current detection unit configured to convert the current signal from the radiation detection sensor to a voltage signal;

a gain setting unit configured to set a gain of the current detection unit;

a comparison unit configured to compare the voltage signal from the current detection unit and a threshold voltage;

a threshold setting unit configured to set the threshold voltage of the comparison unit; and a saturation determination unit configured to determine a state of the current detection unit;

wherein, when the voltage signal output from the current detection unit exceeds a threshold voltage that is set to lower than a voltage signal at a time that the current detection unit saturates, the saturation determination unit sends a saturation determination signal to the gain setting unit, and wherein, upon receiving the saturation determination signal from the saturation determination unit, the gain setting unit lowers the gain of the current detection unit.

11. A radiation imaging system comprising:

a radiation imaging apparatus; and a radiation generating apparatus configured to irradiate radiation, wherein the radiation imaging apparatus comprises:

a detector including a detection unit in which pixels having a conversion element that converts radiation into an electric charge are arranged in a matrix shape, a drive circuit configured to drive the detection unit to output electric signals that correspond to the electric charges from the pixels, and a read circuit configured to output the electric signals as image data;

a radiation detection unit configured to detect an irradiation state of radiation at a plurality of positions in the detection unit such that the irradiation state of radiation at least at a center region in the detection unit and at a peripheral region in the detection unit that is separated from the center region is detected, the irradiation state of radiation being different from the image data; and a control unit configured to control operations of the drive circuit and the read circuit in accordance with a detection result obtained by the radiation detection unit, wherein the radiation detection unit is configured to have a plurality of sensitivities such that the sensitivity at the center region in the detection unit is greater than the sensitivity at the peripheral region in the detection unit.

12. A radiation imaging apparatus comprising:

a detector including a detection unit in which pixels having a conversion element that converts radiation into an electric charge are arranged in a matrix shape and a read circuit configured to output electric signals that correspond to the electric charges as image data; and a radiation detection unit configured to detect a start of irradiation of radiation such that a radiation irradiation state at least at a center region in the detection unit and at a peripheral region in the detection unit that is separated from the center region is detected, the radiation irradiation state being different from the image data;

wherein the radiation detection unit is configured to have a plurality of sensitivities such that the sensitivity at the center region in the detection unit is greater than the sensitivity at the peripheral region in the detection unit.

13. The radiation imaging apparatus according to claim 12, wherein the radiation detection unit comprises:

a radiation detection sensor that is arranged in the detection unit and is configured to convert irradiated radiation to a current signal;

a current detection unit configured to convert the current signal from the radiation detection sensor to a voltage signal; and a comparison unit configured to compare the voltage signal from the current detection unit and a threshold voltage, wherein, when the voltage signal from the current detection unit exceeds the threshold voltage of the comparison unit, the radiation detection unit outputs a radiation detection signal indicating a start of irradiation of radiation, and when the voltage signal from the current detection unit is less than the threshold voltage of the comparison unit, the radiation detection unit outputs the radiation detection signal that indicates an end of irradiation of radiation, and wherein each of the plurality sensitivities of the radiation detection unit comprises a sensitivity of the radiation detection sensor and a gain of the current detection unit.

14. A radiation imaging system comprising:

a radiation imaging apparatus; and a radiation generating apparatus configured to irradiate radiation, wherein the radiation imaging apparatus comprises:

a detector including a detection unit in which pixels having a conversion element that converts radiation into an electric charge are arranged in a matrix shape and a read circuit configured to output electric signals that correspond to the electric charges as image data; and a radiation detection unit configured to detect a start of irradiation of radiation such that a radiation irradiation state at least at a center region in the detection unit and at a peripheral region in the detection unit that is separated from the center region is detected, the radiation irradiation state being different from the image data;

wherein the radiation detection unit is configured to have a plurality of sensitivities such that the sensitivity at the center region in the detection unit is greater than the sensitivity at the peripheral region in the detection unit.

* * * * *